No. 847,514. PATENTED MAR. 19, 1907.
C. SCHMIDT.
STARTING DEVICE FOR EXPLOSION ENGINES.
APPLICATION FILED JUNE 22, 1903.
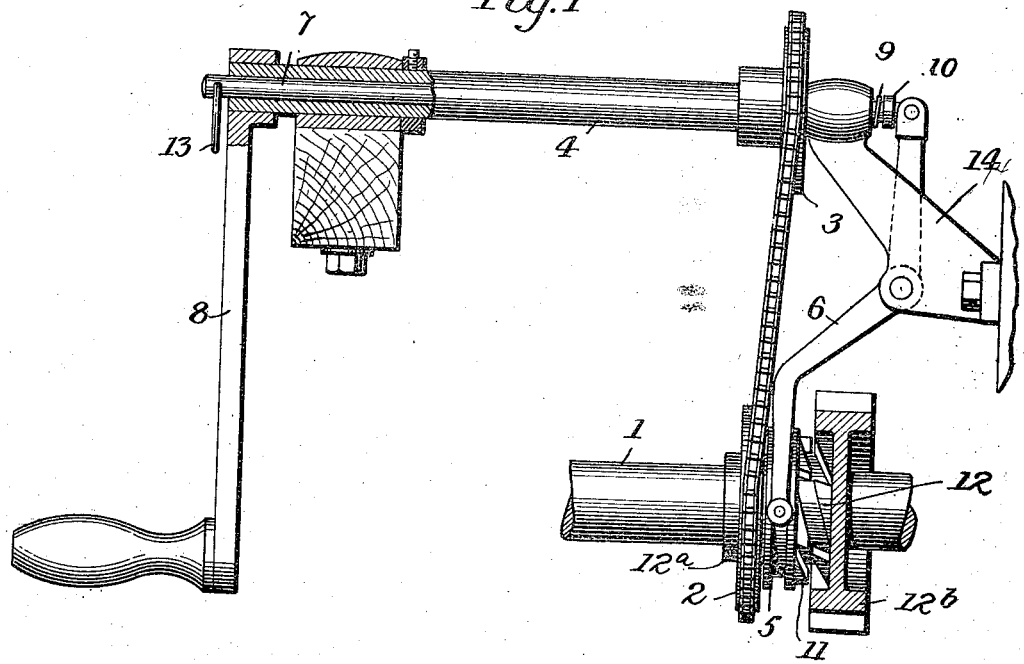
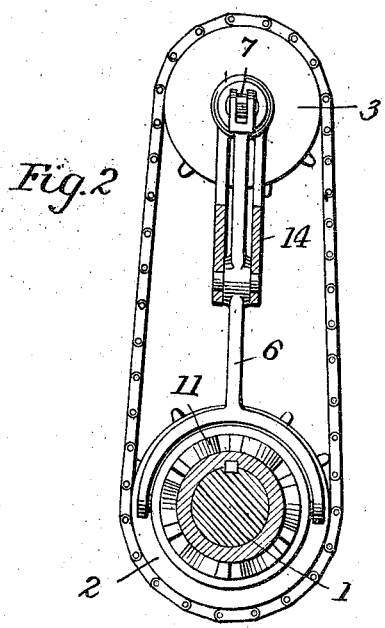
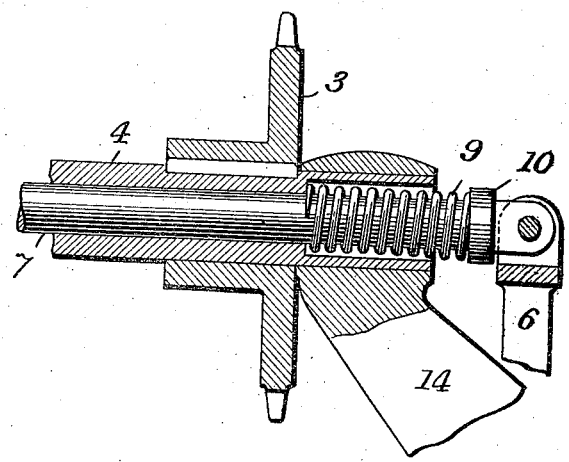
Inventor
Charles Schmidt
Witnesses

UNITED STATES PATENT OFFICE.

CHARLES SCHMIDT, OF WARREN, OHIO, ASSIGNOR TO THE PACKARD MOTOR CAR COMPANY, OF WARREN, OHIO, A CORPORATION OF WEST VIRGINIA.

STARTING DEVICE FOR EXPLOSION-ENGINES.

No. 847,514.      Specification of Letters Patent.      Patented March 19, 1907.

Application filed June 22, 1903. Serial No. 162,629.

*To all whom it may concern:*

Be it known that I, CHARLES SCHMIDT, a citizen of France, and a resident of Warren, in the county of Trumbull and State of Ohio, United States of America, have invented certain new and useful Improvements in Starting Devices for Explosion-Engines, of which the following is a specification.

This invention comprises a convenient and effective means for manually starting a hydrocarbon-motor, and is particularly applicable to motor-vehicles using such motors.

In the accompanying drawing, Figure 1 is a side view of the device embodying the invention, parts being shown in section. Fig. 2 is an end view, partly in section; and Fig. 3 is an enlargement of part of Fig. 1.

Referring to the drawing, 1 indicates the engine-shaft, and 2 a wheel, which is loose on said shaft. The wheel 2, as shown, is a sprocket-wheel; but it may be a gear or pulley or any suitable construction for receiving rotative motion from a similar wheel 3 on a crank-shaft 4. The wheel 2 is connected to a grooved collar 5, and a lever 6, mounted in a fixed bearing 14, has pintles which engage the groove on opposite sides of collar 5. The other arm of lever 6 is connected to a rod 7, extending through a hollow shaft 4 and beyond the crank 8 on said shaft and by which it is adapted to be rotated. The crank or manually-operated shaft is mounted in such a manner that it has no longitudinal movement, and a spring 9, abutting at one end against the crank-shaft and at the other against a collar 10 on the rod 7, holds the wheel 2 and collar 5 normally in left-hand position. On the right face of the collar 5 is a clutch member 11, which coöperates with a second clutch member 12, fixed on the motor-shaft 1. As illustrated, the wheel 2 and collar 5 are arranged on a hub 12ᵃ of the clutch member 12, and a pinion 12ᵇ is connected to said clutch member.

When it is desired to start the motor, the rod 7 is pulled out by means of a ring 13 or other suitable handle, thus engaging the clutch members 11 and 12. The crank 8 is simultaneously turned and movement communicated to the engine-shaft through the shaft 4 and the wheels 2 and 3. The teeth of the clutch members 11 12 are preferably undercut, as shown, so that they will remain interlocked while the crank 8 is being turned, thus rendering it unnecessary to pull on the rod 7 except for a moment to engage them. Immediately on releasing the crank 8 after starting the motor the spring 9 will separate the clutch members.

It will be evident that this invention may be embodied in various forms of mechanism. The form illustrated is the most convenient at present known; but other constructions will readily suggest themselves to the skilled mechanic. The invention is therefore not limited to the precise mechanism illustrated and described.

Having described my invention, what I claim, and desire to secure by Letters Patent, is—

1. In a mechanism for starting a hydrocarbon-motor, the combination with the engine-shaft and a normally open clutch for rotating said shaft, of a shaft adapted to be manually operated, connections between the latter shaft and one of the clutch members, and means for engaging and releasing the clutch including a part mounted coaxially with the manually-operated shaft.

2. In a mechanism for starting a hydrocarbon-engine, the combination with the engine-shaft and a normally open clutch for rotating said shaft, of a shaft adapted to be manually rotated, connections between said manually-operated shaft and one of said clutch members for rotating the latter, and a rod extending through said manually-operated shaft and adapted to close the clutch.

3. A starting device for hydrocarbon-engines comprising in combination with the engine-shaft, fixed and movable clutch members on said shaft, a shaft adapted to be manually operated, connections between the manually-operated shaft and the movable clutch member for r tating the latter, a rod extending through the manually-operated shaft, a lever connecting said rod with the movable clutch member, and means for normally holding said clutch open.

In testimony whereof I have signed my name to this specification in the presence of two subscribing witnesses.

CHARLES SCHMIDT.

Witnesses:
     RUSSELL HUFF,
     H. V. BATCHELLER.